United States Patent [19]
Miller

[11] 3,783,721
[45] Jan. 8, 1974

[54] ROTARY INTERNAL TUBE CUTTER

[75] Inventor: Charlie D. Miller, Manlius, N.Y.

[73] Assignee: Carrier Corporation, Syracuse, N.Y.

[22] Filed: May 30, 1972

[21] Appl. No.: 257,515

[52] U.S. Cl.......................................... 82/82, 29/76
[51] Int. Cl........................... B23b 3/04, B23d 67/00
[58] Field of Search .................. 82/82, 83, 101, 46, 82/47, 70.1, 70.2, 78; 29/76

[56] References Cited
UNITED STATES PATENTS

| | | | |
|---|---|---|---|
| 3,495,312 | 2/1970 | Walker | 29/76 |
| 700,118 | 5/1902 | Hathorn | 82/82 |
| 2,942,092 | 6/1960 | Cammann | 82/83 |
| 3,118,333 | 1/1964 | Pilcher et al. | 82/47 |
| 936,263 | 10/1909 | Young | 82/82 |
| 2,734,573 | 2/1956 | Bailey | 82/82 |

Primary Examiner—Harrison L. Hinson
Attorney—J. Raymond Curtin

[57] ABSTRACT

The invention is a device for severing a tube inwardly of the tube sheet. An arbor is journaled in a spherical bearing structure mounted in a housing. The housing has a tubular extension for insertion in the outer end of the tube being severed for positioning the housing relative to the tube. The arbor extends a distance into the tube and a circular cutter is fixed to the inner end of the arbor. The opposite end of the arbor extends from the housing for attachment to a hand manipulated, power-operated driver, such as a portable drill.

4 Claims, 3 Drawing Figures

PATENTED JAN 8 1974 3,783,721

ROTARY INTERNAL TUBE CUTTER

BACKGROUND OF THE INVENTION

Devices have been perfected for quickly pulling a defective tube outwardly through the tube sheet of a heat exchanger. Prior to the extraction of the tube, it is necessary to detach the opposite end of the tube from the tube sheet at the opposite end of the heat exchanger. Various methods are employed for so detaching the opposite end of the tube. One such method is to collapse the opposite end of the tube by a chisel-like tool to loosen the tube end from the tube sheet. That operation involves the expenditure of considerable time and effort. Also, on occasion the hole in the tube sheet is damaged requiring it to be repaired before installation of a new tube. Power-operated tube cutting devices have been designed but they embody complicated structures expensive to manufacture and maintain.

This invention has as an object a light weight, hand manipulated, power-operated device operable to neatly and quickly sever the tube a short distance inwardly from the tube sheet. The device embodies a particularly simple construction of few parts which can be produced and assembled at low cost.

SUMMARY OF THE INVENTION

A spherical bearing is mounted in a housing provided at one end with a positioning means of tubular form insertable in the end of the tube to be severed. An arbor is journaled in the bearing and extends a short distance into the tube, the inner end of the arbor having fixed thereto a circular cutter. The opposite end of the arbor extends from the opposite end of the housing for connection to a portable power-operated tool, such as an electric hand drill. Upon movement of the drill in a circular path, the cutter is moved in an orbital path in cutting engagement with the tube.

DESCRIPTION OF THE PREFERRED EMBODIMENT

Figure 1:
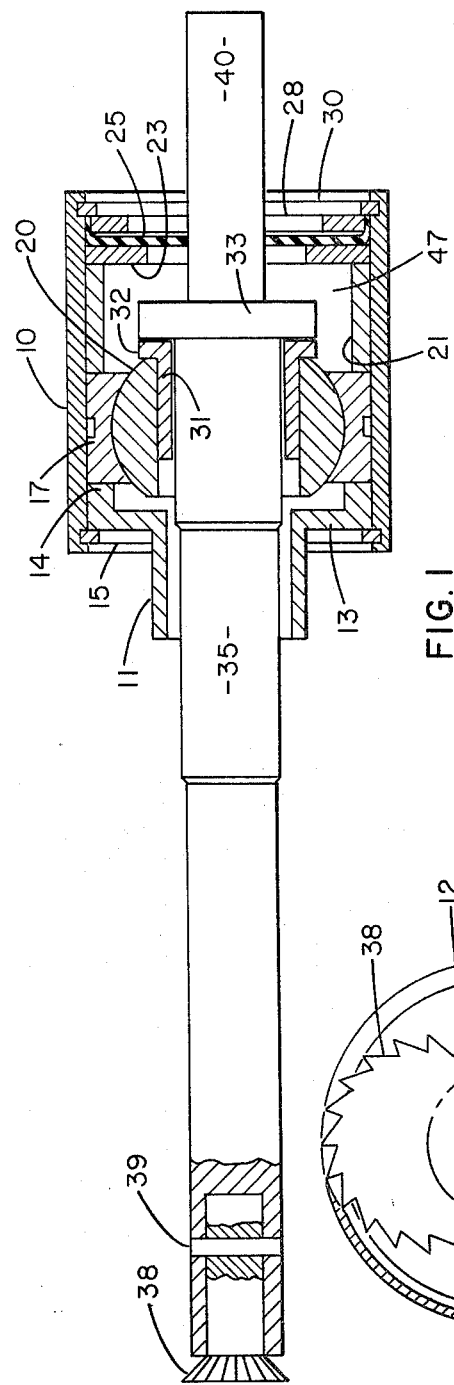
FIG. 1 is a lengthwise sectional view of the tube cutting device embodying my invention.

The device consists of a housing 10 illustrated as being of cylindrical tubular form, the housing is provided with means for positioning and supporting the device during the operation thereof. As shown in the drawings, the positioning means consists of a tubular portion 11 dimensioned for insertion in the outer end of the tube 12 to be severed. The portion 11 merges at its outer end with a radial flange portion 13, which in turn merges with a cylindrical flange portion 14. The cylindrical flange is dimensioned for a close sliding fit with the inner surface of the housing 10. The positioning member is detachably retained against outward movement from the housing 10 by a snap ring 15.

A bearing structure is mounted in the housing, and consists of an outer race portion 17 having an inner concave surface dimensioned to receive an inner spherical member 20, which is formed with a convex peripheral surface complemental to the concave surface of the outer race 17. The outer race 17 is positioned in abutting relation against the flange 14 of the positioning means. A spacer sleeve 21 is positioned in the bore of the housing intermediate the outer bearing race 17 and an annular member 23. A flexible diaphragm 25 is positioned against the outer surface of the member 23. The peripheral portion of the diaphragm 25 extends over a diaphragm retaining ring 28, which is retained in the housing by a snap ring 30, similar to the snap ring 15. With this arrangement, the device can be conveniently disassembled by removal of the snap rings 15, 30. The bearing structure also includes a bushing 31 of bearing material pressed into the spherical member 20. The bushing is formed with a radial flange 32 engaged by a thrust collar 33 formed on an arbor 35 journaled in the bushing 31. The inner diameter of the annular member 23 is less than the diameter of the collar 33, accordingly the member 23 serves as a stop to limit movement of the arbor 35 outwardly from the housing.

One end of the arbor 35 extends a distance into the tube 12 beyond the tube sheet 37. A circular angle cutter 38 is fixed to the inner end of the arbor 35 as by a pin 39, FIG. 1. The diameter of the cutter 38 is less than the internal diameter of the tube 12. The opposite end portion 40 of the arbor extends outwardly from the outer end of the housing 10 through the diaphragm 25, and is adapted to be attached to a hand manipulated, power-operated tool such as a portable hand drill (not shown).

Figure 3:
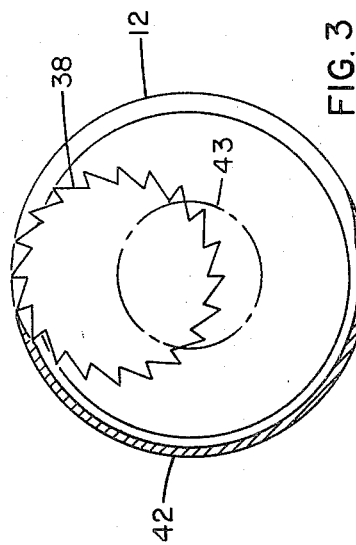
FIG. 3 is an enlarged view taken on line 3—3, FIG. 2, illustrating a major portion of the tube completely severed.

When the driver is moved in a circular path, the spherical bearing structure effects movement of the cutter 38 in an orbital path as indicated by the dotted circle 43, FIG. 3. During this movement, the cutter is engaged in cutting relation with the side wall of the tube cutting through the tube to sever the same. The cutter 38 is dimensioned, relative to the inner end of the arbor 35, so that the cutter extends radially from the arbor a distance sufficient to sever the tube, without cutting the next adjacent tubes.

In operation, the tubular portion 11 of the positioning member is inserted in the tube 12. Due to the spherical bearing structure, the arbor 35 and the cutter 38 can be positioned centrally in the tube and with the portion 13 of the positioning member abutted against the outer end of the tube, the cutter 38 is located inwardly from the tube sheet 37 as previously stated. The driver is than actuated effecting rotation of the arbor. The driver is moved in a circular path and, due to the spherical mounting of the bearing, the cutter 38 is simultaneously moved in an orbital path with the cutter engaging the tube.

Copper tubes are severed upon movement of the driver in a few circular paths. In FIG. 3, the tube section in elevation has been cut by the cutter. In that Figure the cutter 38 is shown moving in its last orbital path for severance of the cross hatch portion 42 of the tube 12. The copper tube is severed in a few seconds.

Figure 2:
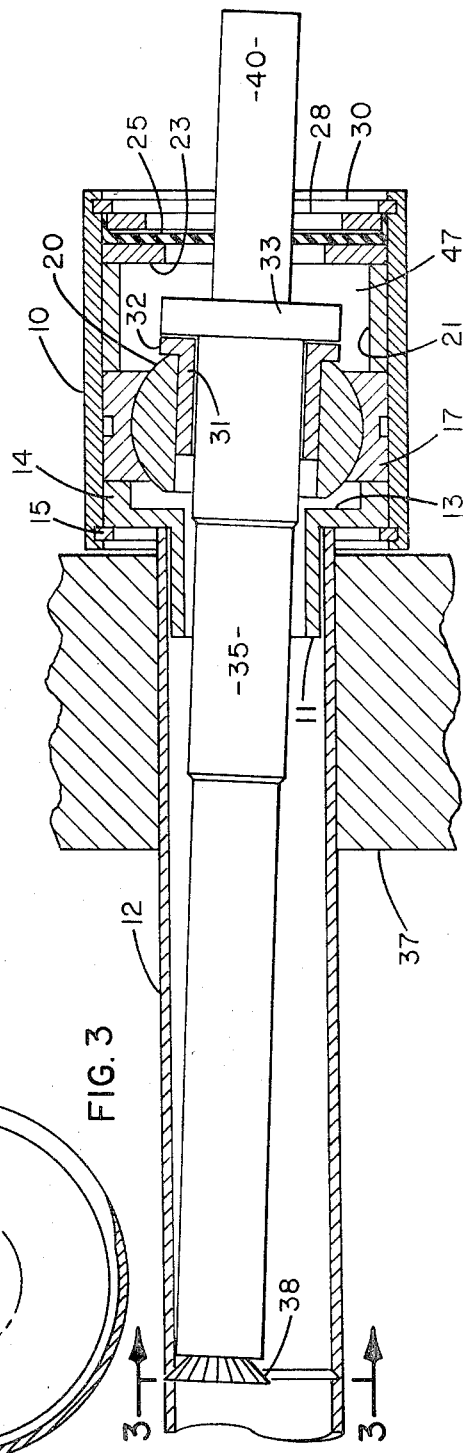
FIG. 2 is a view similar to FIG. 1, illustrating the tube cutter severing the tube.

Referring to FIGS. 1 and 2, it will be seen the cutter 38 is an angle cutter, the teeth or lands of the cutter converge toward the axis of the cutter in a direction toward the arbor 35. With this mounting of the cutter, the device is removed and withdrawn from the tube 12 without the cutter becoming hung up on the separation of the tube effected by the cutter.

The flexible diaphragm 25, while permitting circular movement of the outer portion 40 of the arbor 35 also serves as a closure to retain lubricant in the space 47 between the diaphragm and the bearing structure.

The positioning member may be radially detached from the housing by removal of the snap ring 15 and replaced by a positioning member having a tubular portion 11 dimensioned for insertion in a tube of different diameter, also cutters of different diameters may be readily attached to the arbor, whereby the device is effective to sever tubes of different diameters over a substantial range.

While I have described a preferred embodiment of my invention, it is to be understood that the invention is not limited thereto, but may be otherwise embodied within the scope of the following claims.

I claim:

1. A tube cutting device for severing a tube in an area spaced inwardly from a tube sheet; said device comprising:

a housing, positioning means detachably secured to said housing and having a portion insertable in the outer end of the tube, a spherical bearing structure mounted in said housing intermediate the ends thereof, an arbor journaled in said bearing and having an inner portion extending through said positioning means into said tube, said arbor having limited free axial movement in said bearing, a circular cutter fixed to the inner end of said arbor, said cutter having a diameter less than the internal diameter of said tube, and greater than the diameter of said arbor, said arbor having an opposite end portion extending outwardly from the opposite end of said housing for attachment to a hand manipulated power operated driver operable to effect rotation of said arbor and cutter, said cutter being movable in an orbital path into cutting engagement with the tube upon movement of the opposite end of said arbor in a circular path, said cutter being operable upon such engagement to sever the tube.

2. A device as set forth in claim 1 wherein said positioning means is formed with a radially extending portion for engagement with the outer end edge of the tube.

3. A device as set forth in claim 1 wherein a flexible diaphragm is fixed in the said opposite end of said housing in spaced relation to said bearing and is formed with an aperture for receiving the opposite end portion of said arbor.

4. A tube cutting device as set forth in claim 1 including stop means mounted in said housing and serving to limit axial movement of said arbor in said bearing.

* * * * *